July 8, 1958 — T. M. JABLON — 2,841,904
SLIDE MOUNTINGS
Filed Jan. 29, 1957 — 2 Sheets-Sheet 1
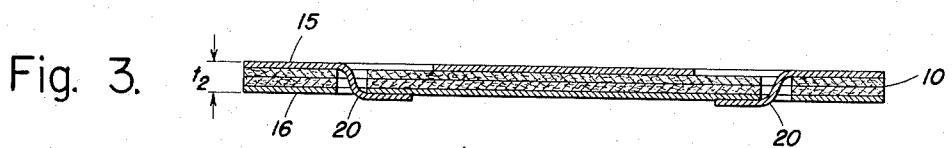
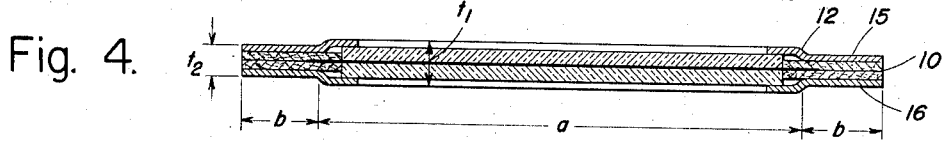
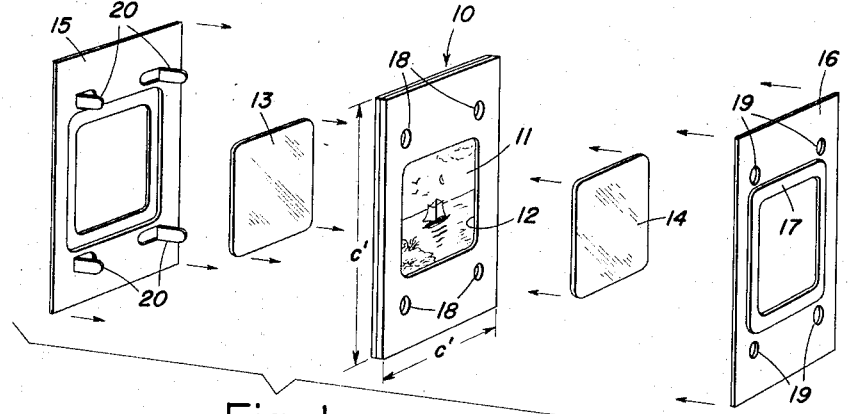
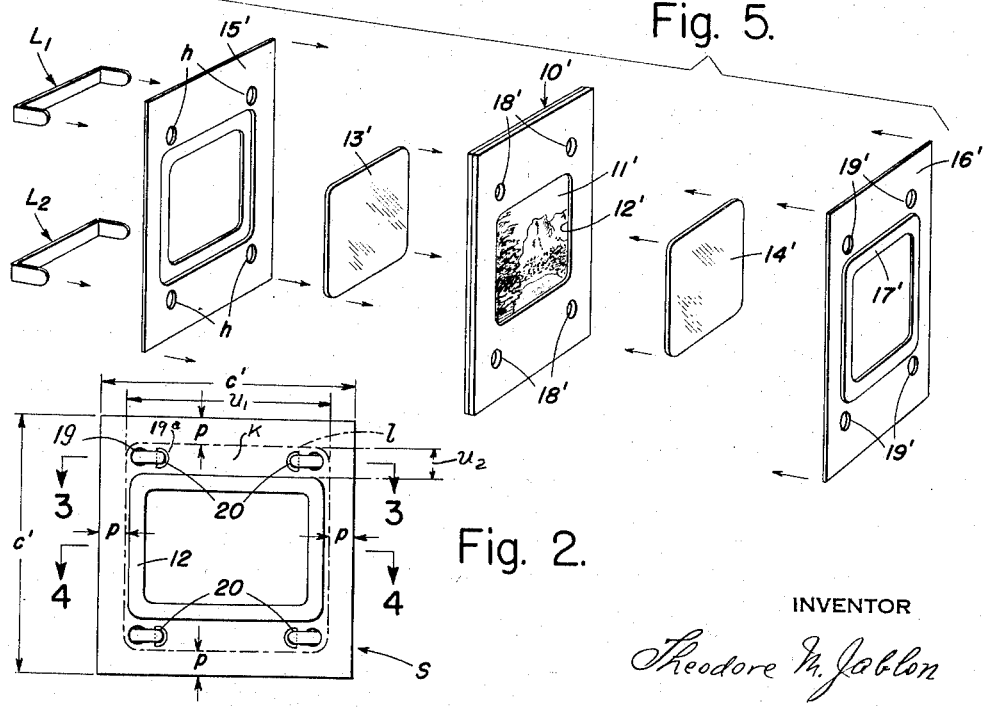
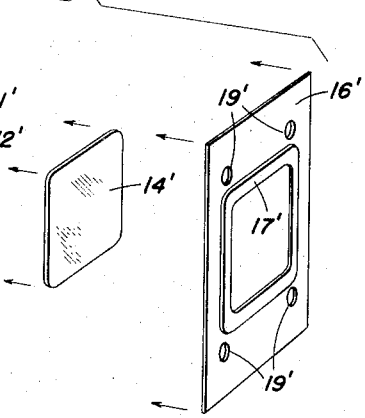
INVENTOR
Theodore M. Jablon July 8, 1958     T. M. JABLON     2,841,904
SLIDE MOUNTINGS
Filed Jan. 29, 1957     2 Sheets-Sheet 2
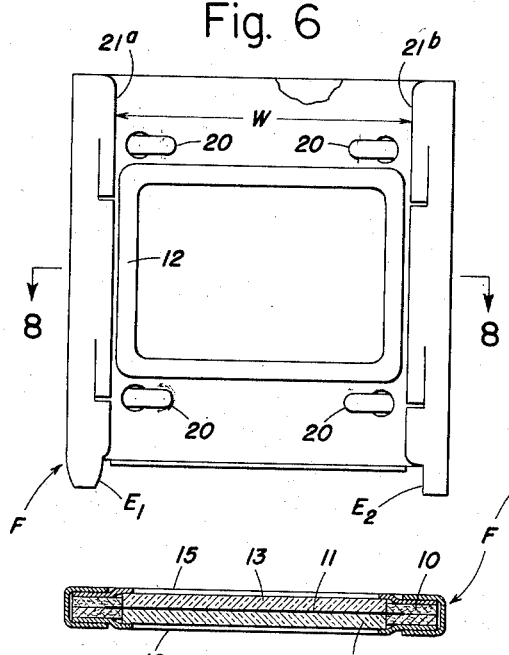
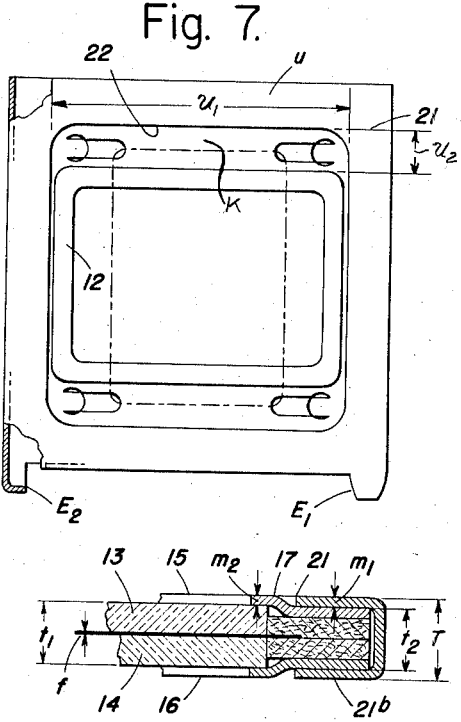
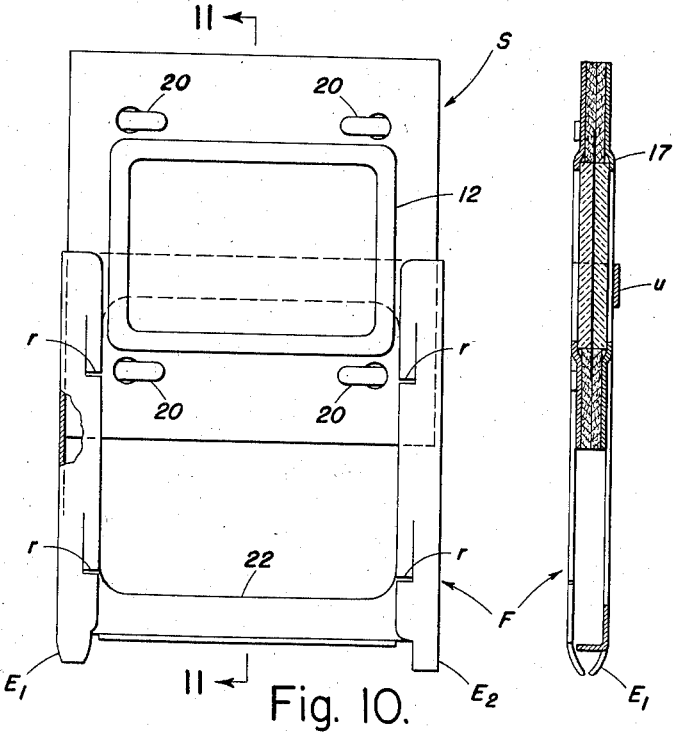
INVENTOR
Theodore M. Jablon

2,841,904
SLIDE MOUNTINGS

Theodore M. Jablon, Stamford, Conn.

Application January 29, 1957, Serial No. 637,044

6 Claims. (Cl. 40—152)

This invention relates to mountings for film transparencies or slides to be used in still projectors or viewers.

Such transparencies, as exemplified by the well known 35 mm. color transparencies, are usually obtained ready mounted in light and thin cardboard frame herein termed the primary frame, capable as such to be used directly in the projector. In such a primary frame the film is unprotected against damage or touch, and with it one may also experience the familiar buckling or snapping out of focus of the film due to temperature changes or otherwise.

If protection is desired of the film against damage as well as against buckling, such transparencies require to be separated from the primary frame for re-mounting between protective transparent plates or glass plates in order to have the film confined and flat between the plates.

More particularly, this invention is concerned with improvements in the kind of protective slide mounting that is shown in my Patent No. 2,496,008. The mounting disclosed in that patent provides flat confinement of the film directly between protective glass plates applied to the primary frame without disturbing the film therein, that is without necessitating the removal therefrom. This is accomplished by seating a glass plate directly into each of the shallow recesses that is formed by each face of the film with associated portion of the primary frame.

For retaining each glass plate thus seated upon the primary frame the patented mounting discloses a pair of auxiliary frames or cover frames having a frame opening slightly smaller than the size of the glass plate, each cover frame in the patent being affixable to a respective face of the primary frame. The glass plate usually has a practical thickness somewhat greater than the depth of the shallow recess of the thin primary frame, hence the cover frames as disclosed in the patent have a recess running along the edge of the picture opening.

It is among the objects to provide a glass-protected slide mounting embodying the main features of the aforementioned patented mounting, and which is durable and wear resistant, of great all around compactness and lightness, highly resistant to glass breakage, simple and inexpensive to manufacture, and in which the parts are convenient to assemble and to lock together.

An additional object is to provide a glass-protected slide of such compactness and contour characteristics as to lend itself specifically for use in certain magazine type slide projectors which have attachable magazine boxes containing slide holding feeder frames.

In providing such specially contoured glass-protected slides for the feeder frames, the problem more precisely lies in minimizing the marginal thickness of the slide assembly even though employing glass plates of an adequate and customary thickness. In other words, the problem here lies in providing a self-contained glass-protected slide assembly thin enough to meet the compactness requirements of the feeder frames and magazine boxes, yet thick enough to provide a desired practical thickness of the glass plates to be used.

To minimize the thickness of the slide assembly is of special importance because of the fact that each slide is contained in its individual feeder frame which frames in turn are contained in a compartmented magazine box attachable to the slide projector. Each such box is compartmented for individually accommodating each feeder frame with its slide, and each feeder frame is extendable from, and retractable into its compartment. That is, at each stepwise advance of the magazine box, a feeder frame is extended into the projector for projection, and then retracted into the box prior to again advancing the box another step to bring the next feeder frame in line for projection.

In such a compartmented magazine box with its own set of feeder frames crowded into the box, total compactness of the magazine boxes is an important factor. Greatest possible compactness has been attainable heretofore only by dimensioning the feeder frames for the reception of only the thin base cardboard frames or primary frames, still leaving the film itself free to collect dust particles on its surface and also free to buckle.

Therefore, it is a more specific object to provide glass-protected slides so compact in thickness and in contours as to make possible their accommodation in the highly compact feeder frames of the magazine boxes, even while offering the advantage of retaining the original primary frame intact and undisturbed, yet employing glass plates of a desired safe customary thickness.

According to this invention, the foregoing objects are attained by providing a slide assembly which comprises the thin primary frame, a pair of glass plates seated in the respective shallow recesses of this primary frame, and a pair of cover frames for retaining the glass plates in place upon the primary frame.

In this slide assembly, the cover frames substantially match the primary frame along the outer free edges thereof. The parts of this assembly are held together by means of prongs extending from one cover frame through matching holes provided in the primary frame and also provided in the opposite cover frame, which prongs are bent over out and against the outer face of the opposite frame to lock the parts together. These prongs greatly facilitate the assembly of the parts, inasmuch as they maintain the parts in registry with respect to one another prior to locking them together.

Each cover frame is made as by stamping from a suitable sheet material such as thin aluminum sheeting, and is formed with an offset or raised portion shaped to constitute along the edge of the picture opening, for accommodating excess thickness of the glass plates seated upon the primary frame.

Outwardly the raised picture-encircling portion of each cover frame appears as a flat ledge surrounding the picture of the film. This slide assembly, therefore, has a marginal portion of reduced thickness, and a central portion of a thickness greater than that of the marginal portions by the amount of excess of the glass plates seated in the primary frame. The bent-over portions of the prongs lie substantially in a plane with the respective raised portions of the cover frames.

According to one embodiment, the prongs are in the form of tabs struck from the cover frame. According to another embodiment, the prongs are provided by a separate lip members inserted into matching pre-arranged holes provided in the respective parts of the slide assembly.

Because of the contour characteristics above defined this slide assembly when inserted into the aforementioned feeder frame, constitutes therewith what may be termed a complementary relationship. That is to say, the feeder frame has a body portion with an opening that represents an area within which lodges the central raised portion of the slide assembly, that is the portion that is formed by the picture-encircling ledge of the respective cover frame. The bent-over prongs also lodge within that area. The feeder frame is formed along each of two opposed edges of its body portion with an inwardly overhanging flange, the two flanges thus pointing towards each other and spaced from the body portion to constitute therewith a pair of parallel grooves for the reception and retention therein of the self-contained slide assembly. These parallel retaining flanges define between them an open area within which lodges the respective other raised portion of the slide assembly. In this way, the feeder frame huggingly surrounds and encompasses the marginal thickness of the slide assembly, although surrounding and clearing the raised picture-encircling ledges as well as the bent-over locking means or prongs thereof. In fact, it is further characteristic of the complementary relationship of the component portions that the feeder frame is capable of momentary deformation or resilient buckling in a manner and sufficient to allow the respective raised portion of the slide assembly to slip into place to lodge within the picture aperture of the feeder frame. Because of this complementary relationship of the component portions, the encompassing feeder frame adds nothing to the net thickness of the original slide assembly, so that the loaded feeder frame is insertable compactly into the magazine box.

Each feeder frame has a narrow shelf or ledge along the third edge of the apertured body portion, to serve as an end abutment for the slide being inserted into the feeder frame as into a specially fitted pocket. Each feeder frame is provided or formed with means whereby the frame is alternatingly engageable by, an releasable from the slide changing actuating mechanism proper of the slide projector. That is to say, a slide is placed in each feeder frame, and a series of such loaded feeder frames is placed in the compartmented magazine box which in turn is exchangeably attachable to the slide projector. The actuating mechanism operates to move each feeder frame into the projector and again back into the box. When a pre-arranged series of slides has thus been projected, another magazine box may be substituted.

In summary, this invention lies in improvements of the slide assembly over and above, although including the main features of the mounting shown in Patent No. 2,496,008. These improvements provide a glass-protected film transparency or slide assembly comprising the primary frame, the glass plates, and the cover frames. Characteristically, this assembly has a raised central glass-containing portion, and a marginal portion the thickness of which is significantly reduced as against the central portion. The marginal thickness consists of the combined thicknesses of the primary frame and of the gauge thicknesses of the primary frame and of the gauge thicknesses of the cover frames. Locking means in the form of prongs are provided for interconnecting the parts of the slide assembly in registry with one another, the prongs being set back inwardly from the edges of the assembly. Hnce it is characteristic that the edge portions are of reduced thickness as well as unencumbered, and that the slide assembly forms a compact combination with the feeder frame in which the component portions are complementary with respect to one another in the manner set forth above.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embracd therein.

Figure 1 is an exploded view in perspective of the parts of the assembly, with the prongs of the one cover frame in position to receive the respective other part.

Figure 2 shows the parts of Figure 1 assembled and interlocked by the prongs, as viewed from the right side of Figure 1.

Figure 3 is a transverse section of the slide assembly, taken on line 3—3 of Figure 2.

Figure 4 is a transverse section of the slide assembly, taken on line 4—4 of Figure 2.

Figure 5 is an exploded view similar to that of Figure 4, although embodying a different manner of providing the prongs.

Figure 6 is a view of the slide assembly similar to that of Figure 2, although in combination with an encompassing feeder frame.

Figure 7 is a view of the Figure 6 combination, although upon the rear thereof.

Figure 8 is a transverse sectional view of the combination shown in Figure 6, taken on the line 8—8 thereof.

Figure 9 is an enlarged detail view of the right hand end of Figure 8, illustrating a specific complementary relationship of the parts.

Figure 10 shows the slide assembly part-way inserted into the feeder frame.

Figure 11 is a vertical sectional view of Figure 10, taken on line 11—11 thereof.

The slide assembly shown in Figures 1 to 4 comprises a primary frame 10 in the form of the familiar relatively thin cardboard frame having mounted therein a film transparency 11. Each face of the film forms with the respective adjoining frame portion a shallow recess 12 for the reception and seating therein of protective glass plates 13 and 14 respectively, the glass plates to be held in place by means of cover frames 15 and 16 respectively. Each of the cover frames 15 and 16 has an embossed or raised edge portion 17 defining the picture opening of the cover frame and appearing outwardly as a flat shallow ledge the inside hollow of which will accommodate the extra thickness of respective glass plates 13 and 14, which extra thickness is that which is in excess of the depth of the shallow recess 12.

The primary frame 10 has a set of four holes 18, and the cover frame 16 a set of matching holes 19. The other cover frame 15 is formed with a set of four prongs 20 struck as stamped from the frame itself to extend at right angles from the inner face thereof. The parts of Figure 1 can be assembled by seating the glass plates 15 and 16 in their respective recesses 12 of primary frame 10, and then impaling the primary frame as well as the complementary cover frame 16 upon the prongs of cover frame 15. While the parts are held together and down upon the cover frame 15, the prongs 20 are bent over towards each other and against the adjoining face of cover frame 16 substantially as shown in Figures 2 and 3. In this way, all the parts of this assembly are interlocked with one another to constitute self-contained slide assembly "S." The resulting assembly has an inner raised portion indicated at "a" in Figure 4, and an outer portion "b" of relatively reduced thickness surrounding the raised portion "a." The effective thickness "$t_1$" of the raised central portion of this slide assembly comprises the sum of the component thicknesses of the film "$f$," of the glass plates 13 and 14, and of the metal gauge thicknesses of the two cover frames 15 and 16. The effective thickness $t_2$ of the marginal reduced portion is the sum total of the component thicknesses of the primary frame 10 and of the metal gauge thicknesses of the two cover frames 15 and 16. The cover frames 15 and 16 are square in shape and edgewise match the primary frame 10, so that the length "$C^1$" of the edges of the primary frame 10 are substantially identical to length "$C^1$" of the slide assembly shown in Figure 2.

From Figure 2 it is seen that the raised portion "$a$" of the assembly as well as the bent-over portions of prongs 20 are disposed within a square area indicated by a dot-and-dash line "$l$," thus providing an unemcumbered edge portion of the width "$p$" and of the reduced thickness $t_2$.

The practical importance of thus providing the unencumbered edge portion "$p$" is demonstrated in the showing of Figures 6 to 11 which present the combination of Figures 1 to 4 slide assembly "S" with an encompassing feeder frame "F" for magazine boxes of the kind of projector initially outlined.

This feeder frame "F" consists of a flat body portion 21 having a square opening 22. Along the vertical margins of this body portion 21 are provided inwardly overhanging flanges $21^a$ and $21^b$ spaced from the body portion 21, these flanges $21^a$ and $21^b$ pointing towards each other so that thus there are formed with the body portion 21 a pair of grooves for the reception therein of slide assembly "S," the grooves being more specifically dimensioned for the reception of the reduced marginal thickness $t_2$ of that assembly. Along its bottom edge the body portion 21 is formed with a ledge 23 to constitute a bottom or abutment for the slide assembly "S." At each bottom corner the feeder frame "F" is formed with a specially shaped hollow extension or hollow lug $E_1$ and $E_2$ such as found on this kind of feeder frame for the engagement thereof and actuation by the slide changing mechanism aforementioned.

When the slide assembly "S" is placed in the feeder frame "F," see Figures 6 to 11, the parts thereby assume a certain specific complementary relationship with respect to one another in the sense that the raised portions of slide assembly "$S_1$" will then occupy and extend into the free areas or spaces of feeder frame "F." This complementary relationship is to be understood in the sense that the raised portion or flat ledge 17 of one cover frame 16 extends into the area defined by the opening 22 of the encompassing feeder frame "F," whereas the corresponding raised portion of the other cover frame 15 extends into the space or area designated by the distance "W" between the two overhanging vertical flanges $21^a$ and $21^b$.

Also confined within these respective open areas of the feeder frame "F" are the bent-over portions of prongs 20, such confinement having been indicated above by the hypothetical encircling dot-and-dash line "$l$" in Figure 2.

The significance of this specific complementary relationship between assembly "S" and feeder frame "F" appears most clearly from the sectional views of Figures 8, 9, 10, showing that the raised flat ledges 17 of the assembly "S" fall substantially in a plane with the adjoining portions of the feeder frame. In this way, see Figure 9, the total net thickness "T" of the feeder frame is substantially equal to the thickness $T_1$ of assembly "S" in that the metal gauge thickness $m^1$ of feeder frame "F" substantially aligns with the metal gauge thickness $m^2$ of the respective cover frames 15 and 16.

Figures 10 and 11 further illustrate this complementary relationship of the parts by the fact that the feeder frame "F" is subjected to a slight temporary resilient deformation as the assembly "S" is being inserted into feeder frame "F." That is to say, the upper transverse web portion "U" of the feeder frame at that time is caused to buckle sufficiently to allow the respective raised portion 12 of assembly "S" to pass into the feeder frame, finally to snap into and lodge in the square opening 22 of the feeder frame. Each of the vertical flanges $21^a$ and $21^b$ of the feeder frame is shown to have formed therein a pair of resilient tongues "$r$" bearing upon the adjoining cover plate 16 of slide assembly "S."

The exploded perspective view of Figure 5 is similar to that of Figure 1, and corresponding parts are designated by like numerals although with the addition of the prime sign thereto. A structural distinction, however, lies in the fact that the interlocking means for the cover plates 15' and 16' are provided in the form of a pair of separate clip members $L_1$ and $L_2$, and the cover plate 15' therefore is provided with a set of holes "$h$" to register with holes $18^1$ of primary frame 10' and with holes 19' of the other cover frame 16'.

In this way, the clip members $L_1$ and $L_2$ each are disposed within an elongated unencumbered area "K" of the subassembly, which area is defined in Figures 2 and 7 by the length $u_1$ and by the width $u_2$, with the clip members extending alongside the respective associated long side of the raised ledge 17 surrounding the rectangular picture opening.

Fig. 2 although representing the assembly of the parts of the Fig. 1 exploded view with openings 19 provided in cover frame 16, has indicated in that frame additional openings $19^a$ of half round shape into which the tips of the respective prongs 20 can be depressed.

I claim:

1. A protective glass plate mounting for a film transparency marginally held in a primary frame and having a pair of protective transparent plates seatable in the respective recesses formed by each face of the film with the associated primary frame portions, and a pair of cover frames applicable to said primary frame, each for holding a respective transparent plate, for use with an encompassing frame for receiving and edgewise encompassing said primary frame with said transparent plates and with said cover frames, which encompassing frame in turn comprises a flat body portion having an opening of substantially square configuration, a pair of inwardly overhanging flanges along opposed edges of the body portion and spaced therefrom to constitute a pair of parallel grooves facing one another for the insertion therein of a slide, and also comprising at the third edge of said body portion an abutment for the slide, with said recesses and the picture opening being rectangular and defined by a long side and a short side and adapted to be surrounded by said square opening so that the short sides of the picture opening extend parallel and adjacent to one pair of edges of said square opening whereas the long sides of the picture opening extend parallel to and spaced from the other pair of edges of said square opening and thus define within said square opening an elongated unencumbered area between each long side of the picture opening and the respective associated parallel edge of the square opening; characterized thereby that each said cover frame is formed with a raised offset portion constituting and outwardly appearing as a flat ledge providing a marginal recess around the picture opening for accommodating excess thickness of the associated transparent plates seated in the primary frame, said assembly of primary frame with transparent plates and cover frames thus providing a marginal portion of reduced thickness surrounding a relatively raised portion and comprising the thickness of the primary frame and the metal gauge thickness of the cover frames so that when said assembly is inserted into said encompassing frame, the raised portions of the assembly will extend within and into the respective open areas of the encompassing frame with the frame hugging respective marginal portions of reduced thickness so that the outer faces of said encompassing frame will fall substantially in a plane with the associated outer faces of said raised portions of the respective cover frames of the assembly after insertion thereof into the encompassing frame, with the addition that the one cover frame is provided with a first pair of tongue shaped fastening prongs extending from the inner face thereof and disposed at the respective ends of the one long side of said flat raised ledge, said primary frame and the other cover frame having matching openings for receiving said prongs, each prong having a terminal portion bent over inwardly flat against the outer face of said other cover frame in a manner to interlock the component parts of said assembly, with said bent over portions extending parallel to and substantially in a plane with the associated long side of the flat raised ledge so as to lie within the respective elongated unencumbered area of the square opening, and a second pair of similar fastening prongs similarly disposed at the opposite long side of the flat raised ledge and extending from said one cover frame through matching openings in the primary frame and in said other cover frame, with similarly bent over portions disposed in the respective elongated unencumbered area within the square opening.

2. The glass plate mounting according to claim 1, in which said prongs are struck from and integral with said cover frame.

3. The glass plate mounting according to claim 1, in which there is provided a pair of U-shaped clip members each comprising an elongated body portion and a pair of end shank portions representing a pair of said prongs, with said prongs extending through matching openings in both said cover frames and said primary frame, and said body portion extending alongside the associated long side of the raised ledge.

4. The combination of a protective glass plate mounting applied to a film transparency marginally held in a primary frame, with an encompassing frame containing said glass plate mounting, in which said protective mounting comprises a pair of protective glass plates seated in the respective recesses formed by each face of the film with the associated primary frame portions, and a pair of cover frames applicable to said primary frame, each for holding a respective glass plate, and in which said encompassing frame comprises a flat body portion having an opening of substantially square configuration, a pair of inwardly overhanging flanges along opposed edges of the body portion and spaced therefrom to constitute a pair of parallel grooves facing one another for the insertion therein of a slide, and also comprising at the third edge of said body portion an abutment for the slide, with recesses and the picture opening being rectangular and defined by a long side and a short side and adapted to be surrounded by said square opening so that the short sides of the picture opening extend parallel and adjacent to one pair of edges of said square opening whereas the long sides of the picture opening extend parallel to and spaced from the other pair of edges of said square opening and thus define within said square opening an elongated unencumbered area between each long side of the picture opening and the respective associated parallel edge of the square opening; characterized thereby that each said cover frame is formed with a raised offset portion constituting and outwardly appearing as a flat ledge providing a marginal recess around the picture opening for accommodating excess thickness of the associated glass plates seated in the primary frame, said assembly of primary frame with transparent plates and cover frames thus providing a marginal portion of reduced thickness surrounding a relatively raised portion and comprising the thickness of the primary frame and the metal gauge thickness of the cover frames so that when said assembly is inserted into said encompassing frame, the raised portions of the assembly will extend within and into the respective open areas of the encompassing frame with the frame hugging respective marginal portions of reduced thickness so that the outer faces of said encompassing frame fall substantially in a plane with the associated outer faces of said raised portions of the respective cover frames of the assembly after the insertion thereof into the encompassing frame, with the addition that the one cover frame is provided with a first pair of tongue-shaped fastening prongs extending from the inner face thereof and disposed at the respective ends of the one long side of said flat raised ledge, said primary frame and the other cover frame having matching openings for receiving said prongs, each prong having a terminal portion bent over inwardly flat against the outer face of said other cover frame in a manner to interlock the component parts of said assembly, with said bent over portions extending parallel to and substantially in a plane with the associated long side of the flat raised ledge so as to be disposed within the respective elongated unencumbered area of the square opening, and a second pair of similar fastening prongs similarly disposed at the opposite long side of the flat raised ledge and extending from said one cover frame through matching openings in the primary frame and in said other cover frame, with similarly bent over portions disposed in the respective elongated unencumbered area of the square opening.

5. The combination according to claim 4, in which said prongs are struck from and integral with said cover frame.

6. The combination according to claim 4, in which there is provided a pair of U-shaped clip members each comprising an elongated body portion and a pair of end shank portions representing a pair of said prongs, with said prongs extending through matching openings in both said cover frames and said primary frame, and said body portion extending alongside the associated long side of the raised ledge.

References Cited in the file of this patent

UNITED STATES PATENTS

| | | |
|---|---|---|
| 2,132,670 | Young | Oct. 11, 1938 |
| 2,527,765 | Roehrl | Oct. 31, 1950 |